…

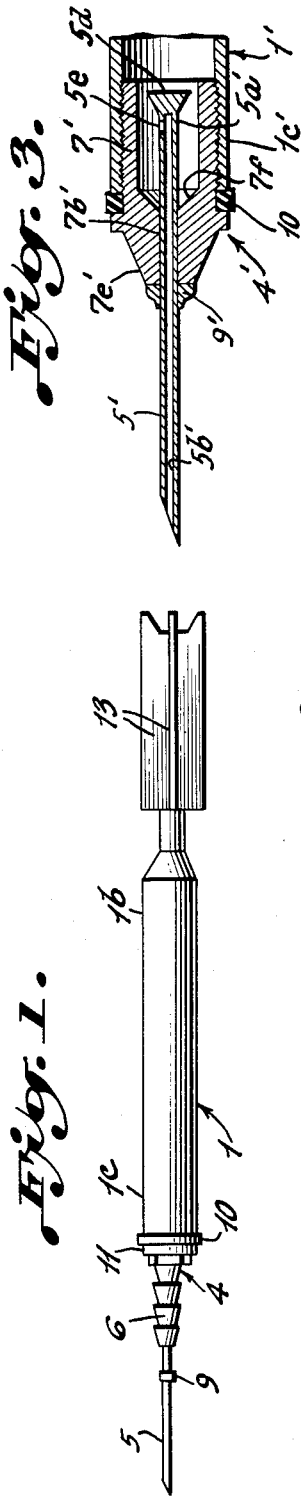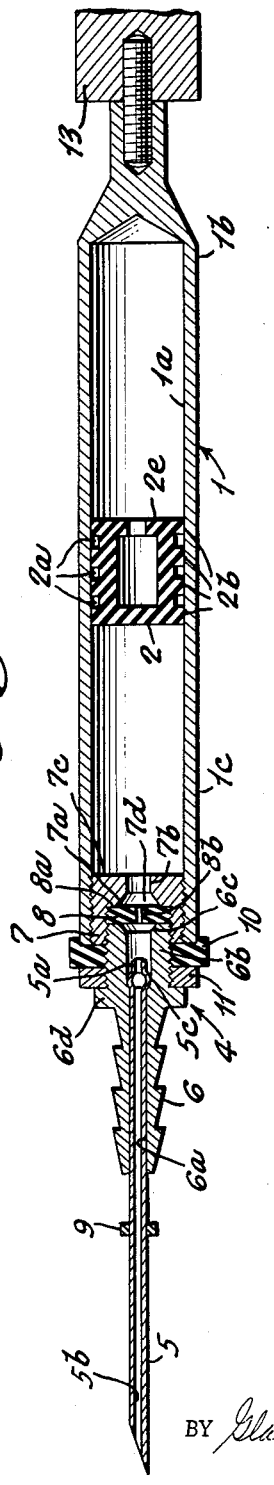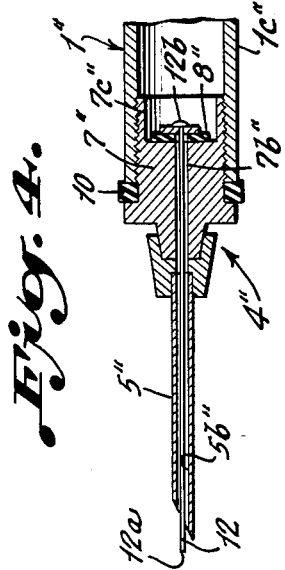
INVENTOR
COLIN A. MURDOCH
BY Glascock, Downing + Seebold
ATTORNEY

3,207,157
MEANS FOR USE IN THE ADMINISTERING OF DRUGS, MEDICINES AND THE LIKE TO ANIMALS
Colin A. Murdoch, 14A Hassal St., Timaru, Canterbury, New Zealand
Filed Nov. 19, 1962, Ser. No. 238,448
Claims priority, application New Zealand, Nov. 24, 1961, 130,788
3 Claims. (Cl. 128—218)

This invention relates to improvements in means for administering drugs, medicines and the like to animals and more particularly to a means for administering drugs, medicines and the like to an animal which is situated at a distance from or unapproachable by a person desiring to administer the drugs, medicines and the like to such animal.

It is the object of this invention to provide an improved means for administering drugs, medicines and the like to animals, such means being a projectile in the form of a hypodermic syringe arranged and constructed to be projected from a projecting device and wherein such projectile is effective in administering the drugs, medicines and the like to an animal with a minimum of delay following impact of the projectile with the animal.

It is a further object of this invention whereby the improved means for administering drugs, medicines and the like in the form of an hypodermic syringe is easily fillable or loadable with the drug or medicine to be administered and whereby the accuracy of the dose may be ensured and further whereby the dose may be easily varied to suit the prevailing conditions.

According to this invention the improved projectile in the form of a hypodermic syringe comprises a hollow body member, a piston contained within and movable within the hollow body member, the body member being provided with an actuating means for moving the piston in the body member, such actuating means being contained within and operable within the hollow body member, a hollow needle extending from within the anterior portion of the body member and a valving means situated within and at the end of the anterior portion of the body member whereby drugs and the like when contained within the body member can be discharged on movement of the piston, actuated by the actuating means.

The invention will now be described with reference to the accompanying drawings in which:

FIGURE 1 is an elevational view of the preferred form of the invention.

FIGURE 2 is a view in longitudinal cross section of FIGURE 1.

FIGURE 3 is a fragmentary sectional view showing an alternate form of the valving means according to the invention.

FIGURE 4 is a fragmentary sectional view showing a further form of the valving means according to the invention, and FIGURE 5 is a fragmentary view partly in elevation and partly in cross section showing an alternate form of the actuating means of this invention.

In one form of this invention (referring to FIGURES 1 and 2 and 5) a body member denoted generally 1 of the projectile in the form of a hypodermic syringe has a hollow cylindrical construction and the body member 1 is of dimensions ensuring a capacity sufficient to accommodate a required quantity of drugs, medicines and the like together with the piston and the piston actuating means.

Piston 2 is of circular cross section to conform with the cylindrical hollow interior of the body member 1 and is of a resilient nature so that the outer surface of said piston 2 bears against interior wall 1a of the body member 1 thus providing a seal betwen the piston 2 and the wall 1a of the body member 1.

In a preferred form of this invention (referring to FIGURES 1 and 2), the actuating means is in the form of a gas compressed within the body member 1 and between the piston 2 and posterior portion 1b of the body member 1, whereby when the projectile syringe is loaded with a drug or medicine for the purpose of injecting such drug or medicine into an animal as aforesaid, the drug or medicine occupies and fills anterior portion 1c of the body member 1 thereby moving the piston 2 rearwardly of the body member 1 thus further compressing the gas contained between the piston 2 and the posterior portion 1b of the body member. The drug or medicine is thereby held under pressure ready for injection into an animal.

In conjunction with this preferred form of the actuating means, the piston 2 may be provided with annular grooves 2a thereby providing peripheral upstanding projections 2b which are adapted to bear against the inner surface 1a of the body member 1 thus sealing the interior of the anterior portion 1c from the interior of the posterior portion 1b containing the actuating means in the form of a compressed gas. The piston 2 may be hollow and its interior open to the rear of the piston whereby the pressure of the actuating means in the form of a compressed gas may press the peripheral projections against the inner surface 1a of the body member for increasing the effectiveness of the seal between the piston and said inner surface 1a.

When the preferred form of the actuating means (wherein the actuating means is in the form of a compressed gas) is utilized, the gas may be pressurized by any suitable method. A preferred method is by the insertion of a fine hypodermic needle through the piston 2 into the interior of the posterior portion 1b and pumping gas under pressure through such needle to pressurize the actuating means.

It is an object in providing the piston 2 with the hollow interior that the piston 2 may be moved, by the charging of the body member 1 with the drug or medicine, to abut the rear end of the interior of the body member so as to permit the maximum quantity of the drug or medicine to be contained by the body member should such a quantity be desired to be administered to the animal.

In a further form of the invention (see FIGURE 5), the actuating means is in the form of a helically wound compression spring 30 contained within the posterior portion 31 of the body member 32 and acting between posterior end 33 of the piston and the end of the posterior portion 31 of the body member 32.

In FIGURE 5 the piston 34 has an annular depression 35 situated between anterior end portion 36 and the posterior end portion 33 thereof and is constructed as a solid body from a resilient material so that the outer surface of each end portion bears against the interior wall 37 of the body member 32 for the purpose as aforesaid.

The anterior portion 1c of the hollow body member is capable of receiving valving means denoted generally 4 with such valving means 4 being arranged and constructed to retain a hollow needle 5 therein.

In FIGURE 2, the valving means 4 is operated by the rearward movement of the needle 5 axially of the body member 1. In this form of the invention the valving means 4 comprises a nipple 6 projecting forwardly of the body member 1 and provided with an axial bore 6a therethrough within which the needle 5 is slidable. A valve housing 7 is adapted to be engaged within and on the inner surface 1a of the anterior portion 1c and is adapted to receive a valve 8. The valve 8 is retained within the interior of the valve housing 7 by the nipple 6, butt end 6b of such nipple 6 is adapted to be secured within the valve housing 7 for retaining and securing the valve 8 within the interior of the valve housing 7 as aforesaid. The valve housing 7 and the butt end 6b of the nipple 6 are adapted to secure the valve 8 in position at the periphery 8a of such valve 8, and the butt end 6b of the nipple 6 and the valve housing 7 are formed with concave depressions 6c and 7a respectively around the central axes thereof for the purpose of allowing the valve 8 to be distorted in a direction axially of the body member 1.

The valve 8 is a rubber disc and is pierced through center 8b thereof in such a manner so as to allow for the easy passage therethrough of butt end 5a of the needle 5 but constructed to prevent the passage of the drug or medicine when the butt end 5a is withdrawn. The valve housing is provided with a passage 7b formed axially therein from rear face 7c thereof to valve chamber 7b formed by the concave depression 7a and the concave depression 6c, thereby connecting the interior of the anterior portion 1c of the body member 1 with the valve chamber 7d and thus, when the butt end 5a projects through the axially pierced valve 8, the passage of the drug or medicine is allowed through the bore 5b of the needle 5. The needle 5 is retained in the bore 6a by a collar 9 situated near the anterior end of the needle 5 and by a crimp 5c near the butt end 5a, the positioning of the collar 9 and crimp 5c being such as to allow an axial movement of the needle 5 within the bore 6a sufficient to permit the butt end 5a to pass through the pierced valve 8.

In the assembly of the valving means 4, the valve housing 7 is screwed into the anterior portion 1c until such valve housing 7 is flush with the end of said anterior portion 1c. The valve 8 is then placed over the concave depression 7a provided within the valve housing 7 from the center of which concave depression 7a leads the passage 7b to the interior of the anterior portion 1c. A sealing washer 10 constructed of a suitable flexible material, the periphery of which overlies the body member 1 serves for adequately sealing the projectile syringe against the bore of the barrel of the projecting device, and a further washer 11 whose diameter is substantially the same as the diameter of the body member 1, are then both placed over the butt end 6b and are prevented from passing over the nipple by a flange 6d provided thereon. The nipple 6 is then screwed into the valve housing 7 so as to contain the valve 8 and form the other surface of the valve chamber 7d.

The dimensions of the valve 8, valve housing 7, nipple 6, sealing washer 10, and washer 11 are such that after the nipple 6 has been screwed into the valve housing 7 both the valve 8 and the sealing washer 10 are held firmly in place.

Thus in the operation of this preferred form of the invention, the butt end 5a is pressed through the pierced valve 8 thereby opening the interior of the anterior portion 1c and is filled with the desired quantity of the drug or medicine by, such as, for example, an ordinary hypodermic syringe the needle of which is connected to the needle 5 by means of flexible tubing and the drug or medicine transferred to the projectile syringe. In the filling of the projectile syringe as aforesaid, as the drug or medicine is transferred into the body member 1, the piston 2 is moved rearwardly of the body member 1 against the pressure of the actuating means and is thus subjected to pressure. When the projectile syringe is charged and contains the desired amount of the drug or medicine, the butt end 5a of the needle 5 is withdrawn from the pierced valve 8 thereby preventing the drug or medicine from escaping under pressure from the anterior portion 1c of the projectile syringe.

Upon striking an animal to be injected, subsequent to the firing of the charge projectile syringe from a projecting device such as described in my New Zealand patent specification No. 130784/132777, the needle 5 penetrates the flesh of said animal and at the same time the butt end 5a of such needle 5 is pushed through the pierced valve 8 thus allowing the drug or medicine to pass, under the pressure of the actuating means contained within the posterior portion 1b through the bore 5b of the needle 5 and thus be injected into said animal.

In a modification of the invention (not shown) should it be desired to retain the projectile in the flesh or hide of an animal there may be provided a means for retaining the projectile syringe as aforesaid subsequent to impact, that is when the projectile syringe has been projected to strike an animal and the needle 5 penetrates the skin and flesh of the animal. Such retaining means may be in the form of one or more barbed members situated and projecting forwardly of the anterior end of the body member.

In an alternative form of the valving means 4' shown in FIG. 3, the anterior portion 1c' is arranged to receive the valve housing 7' which may be provided with a forwardly extending projection 7e'. The valve housing 7' has an axial bore 7b' therethrough and the internal diameter thereof is substantially the same as the external diameter of the hollow needle 5'. In this particular construction, the needle 5' is situated in said bore 7b' and has its inner end portion or butt end 5a' arranged as a flared portion 5d which may be in the form of a cone and which flared portion 5d is situated inside the anterior portion 1c of the body member 1. The bore 5b' of the needle 5 terminates short of such flared portion 5d and aperture 5e which is situated in and is open to the side of the needle 5' provides communication between the bore 5b and the interior of the anterior portion 1c'.

The valve housing 7' is provided with a tapered recess or bevelled seat 7f situated at the inner end of the bore 7b', such recess or seat 7f being arranged to receive and have seat thereon the flared portion 5d of the needle 5' and the position of the aperture 5e is such that when the flared portion 5d is seated on the recess or seat 7f, the aperture 5e is within the bore 7b' of the valve housing 7' and thus sealed from the anterior portion 1c'. The needle 5' when assembled in the syringe, is passed through the bore 7b' of the valve housing 7' until the flared portion 5d seats on the recess or seat 7f and there is provided a collar 9' or similar member which is pressed over the outer portion of the needle 5' and moved into position towards the end of the projection 7e and crimped in position over the needle 5' at a short distance from said projection 7e. In this arrangement, when the syringe is projected to strike an animal, upon impact the needle 5' penetrates the skin and flesh of an animal and at the same time the projectile moves forwardly a short distance relative to or along the needle 5' until reaching the crimped flange 9' thus unseating the flared portion 5d from the recess or seat 7f and consequently making open to the interior of the anterior portion 1c' the aperture 5e and bore 5b' of the needle 5'.

In a further form of the invention, shown in FIGURE 4, the valving means 4" comprises a valve housing 7" adapted to engage with the inner surface of the anterior portion 1c" of the body member 1", and a valve actuating shaft 12 adapted to pass through the bore 5b" of the needle 5" and through an axial passage 7b" formed in the valve housing 7", outer end 12a of the shaft 12 projects beyond the tip of the needle 5" and inner end 12b projects into the interior of the anterior portion 1c. A valve 8" of substantially greater diameter than that of the axial bore 7b" is adapted to be attached to the inner end 12b of the valve actuating shaft 12 and adapted to bear upon the inner surface of the valve housing thereby sealing the bore 5b" of the needle from the anterior portion 1c" of the body member 1".

Thus, in this further form of the invention, when the projectile syringe is charged with the drug or medicine, the pressure exerted on and transmitted to the drug or medicine by the actuating means holds the valve 8"

against the inner surface of the valve housing 7″. When the projectile syringe is projected from a projecting device and thus strikes an animal as hereinbefore described, the forward portion 12a which projects from the tip of the needle 5″ is moved rearwardly of the body portion 1″ as the needle 5″ penetrates the flesh of the animal. By this rearward movement of the valve actuating shaft 12, the valve 8″ is dislodged from its position on the inner face of the valve housing 7″ thus allowing the drug or medicine to be injected into the animal.

In an envisaged construction of the projectile hypodermic syringe of this invention, the hollow body is manufactured of a light weight material such as for example a plastic material so that the projectile may be discarded or remain lost without incurring any great expense.

In order to ensure that the projectile syringe of this invention flies a true course subsequent to its being projected from a projecting device it is fitted with a suitable tail fin or flight or fins 13 such as those fitted to arrows and darts.

If so desired, the body member 1 and the tail fin or flight fins 13 may be constructed as one unit and may be moulded from any suitable plastic material.

What I do claim and desire to obtain by Letters Patent of the United States of America is:

1. A projectile adapted to inject liquid medicines, drugs and the like into animals, comprising a hollow cylindrical body, a piston of resilient material within said body capable of axial movement therein and dividing the body into anterior and posterior portions, means for closing the end of said anterior portion, said closing means including a nipple extending forwardly of the end of said anterior portion and provided with a bore extending axially therethrough, a hollow needle positioned in said bore for axial sliding movement therein, said nipple having a butt end, a valve housing secured within said anterior portion and having a face located in spaced parallel relationship to said butt end, a valve member located in the space between said butt end and said face for closing said bore and preventing communication between said anterior portion and the interior of said hollow needle, said butt end and valve housing being provided with concave depressions about the central axes thereof for allowing the valve member to be distorted in directions axial of said body, said anterior portion being adapted to be filled with liquid medicines, drugs and the like, a gas compressed in said posterior portion constituting an actuating means for moving said piston in the direction of said nipple and for maintaining said anterior portion under pressure when said valve member closes said bore in said nipple, said piston having annular grooves around the periphery thereof for forming upstanding peripheral projections, said piston being hollow and open to said posterior portion whereby the pressure of said gas presses said peripheral projections against the inner surface of said body thereby providing a seal between said anterior and posterior portions, and means on the butt end of said hollow needle effective upon penetration of said hollow needle into the animal which displaces said needle axially of said bore for coacting with said valve member for providing communication between said anterior portion and the interior of said needle so that said gas forces said piston toward said nipple thus expelling the liquid contents of said anterior portion through said hollow needle.

2. The projectile as claimed in claim 1 in which said valve members is defined by a rubber disc having a centrally disposed slit therein allowing the passage therethrough of said means on the butt end of said needle yet preventing the passage therethrough of the liquid contents of said anterior portion when said needle is moved axially away from said disc.

3. A projectile adapted to inject liquid medicines, drugs and the like into animals, comprising a hollow cylindrical body, a piston of resilient material within said body capable of axial movement therein and dividing the body into anterior and posterior portions, means for closing the end of said anterior portion, said closing means including a valve housing having an axial passage extending therethrough, a hollow needle supported by said valve housing with the duct of said needle being in axial alignment with said passage, a valve actuating shaft located in said passage and needle duct with the outer end of said shaft projecting beyond the tip of said needle and with the inner end extending into said anterior portion, a valve member of substantially greater diameter than that of said axial passage secured to the inner end of said shaft and adapted to bear against the inner surface of said valve housing for sealing the needle duct from said anterior portion, said anterior portion being adapted to be filled with liquid medicines, drugs and the like, and a gas compressed in said posterior portion constituting an actuating means for urging said piston in the direction of said valve housing and for maintaining said anterior portion under pressure when said valve member bears against the inner surface of said valve housing yet upon the needle penetrating into the animal, the shaft is displaced inwardly thereby moving the valve member away from the inner surface of the valve housing thus providing communication between said anterior portion and the needle duct via said axial passage so that said gas forces said piston toward said valve housing thus expelling the liquid contents of said anterior portion through said needle.

References Cited by the Examiner
UNITED STATES PATENTS

| | | | |
|---|---|---|---|
| 1,815,300 | 7/31 | Harris | 128—215 X |
| 1,819,415 | 8/31 | Harris | 128—215 X |
| 1,929,247 | 10/33 | Hein | 128—218 |
| 2,547,099 | 4/51 | Smoot | 128—173 |
| 2,617,359 | 11/52 | Van Horn et al. | 128—215 X |
| 2,699,167 | 1/55 | Raiche | 128—216 |
| 2,854,925 | 10/58 | Crockford | 128—215 X |
| 2,995,373 | 8/61 | Cox | 128—215 X |

RICHARD A. GAUDET, *Primary Examiner.*